United States Patent
Hewlett et al.

(10) Patent No.: US 7,884,988 B2
(45) Date of Patent: Feb. 8, 2011

(54) SUPPLEMENTAL RESET PULSE

(75) Inventors: Gregory J. Hewlett, Richardson, TX (US); Darren T. McCosky, McKinney, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/886,755

(22) Filed: Jul. 8, 2004

(65) Prior Publication Data

US 2005/0030609 A1    Feb. 10, 2005

Related U.S. Application Data (60) Provisional application No. 60/485,366, filed on Jul. 8, 2003.

(51) Int. Cl.
 *G02B 26/00* (2006.01)
(52) U.S. Cl. .................. 359/224; 359/291; 359/292; 359/295; 359/298; 359/318; 345/85; 345/98; 345/108; 348/770; 348/771; 361/290
(58) Field of Classification Search ................. 359/315, 359/223, 224, 290, 292, 295, 298, 302, 316, 359/318–320; 345/85, 98, 108; 348/770–774; 361/290
See application file for complete search history.

(56) References Cited

U.S. PATENT DOCUMENTS

| | | | | |
|---|---|---|---|---|
| 5,061,049 A | | 10/1991 | Hornbeck | |
| 5,096,279 A | * | 3/1992 | Hornbeck et al. | 348/770 |
| 5,285,196 A | * | 2/1994 | Gale, Jr. | 345/108 |
| 5,289,172 A | * | 2/1994 | Gale et al. | 345/108 |
| 5,444,566 A | * | 8/1995 | Gale et al. | 359/291 |
| 5,581,272 A | * | 12/1996 | Conner et al. | 345/85 |
| 5,583,688 A | | 12/1996 | Hornbeck | |
| 5,706,123 A | * | 1/1998 | Miller et al. | 359/291 |
| 5,771,116 A | * | 6/1998 | Miller et al. | 359/295 |
| 5,835,336 A | * | 11/1998 | Knipe et al. | 361/233 |
| 5,912,758 A | * | 6/1999 | Knipe et al. | 359/290 |
| 5,963,190 A | * | 10/1999 | Tsuboyama et al. | 345/103 |
| 6,008,785 A | * | 12/1999 | Hewlett et al. | 345/85 |
| 6,323,833 B1 | * | 11/2001 | Takeuchi et al. | 345/84 |
| 6,466,358 B2 | * | 10/2002 | Tew | 359/292 |
| 6,480,177 B2 | * | 11/2002 | Doherty et al. | 345/84 |
| 6,590,549 B1 | | 7/2003 | Marshall | |
| 6,891,657 B2 | | 5/2005 | Hewlett et al. | |
| 6,985,278 B2 | * | 1/2006 | Chu et al. | 359/291 |
| 6,987,601 B2 | * | 1/2006 | Kaeriyama | 359/295 |

OTHER PUBLICATIONS

Meier, Robert E., "DMD™ pixel mechanics simulation," TI Technical Journal, DLP-DMD Manufacturing and Design Challenges, Jul.-Sep. 1998, pp. 64-74.

* cited by examiner

*Primary Examiner*—Evelyn A. Lester
(74) *Attorney, Agent, or Firm*—Charles A. Brill; Wade James Brady, III; Frederick J. Telecky, Jr.

(57) ABSTRACT

A micromechanical device and system utilizing a supplemental reset pulse to ensure deflectable members deflect to the desired position. After loading data into a micromechanical device, a reset pulse is used to position the deflectable member to a position indicated by the data. A supplemental reset pulse is then applied to ensure the deflectable member is driven to the position indicated by the data. The method and system are also used to ensure the deflectable members are driven to a neutral position.

3 Claims, 7 Drawing Sheets

SUPPLEMENTAL RESET PULSE

This application claims priority under 35 USC §119(e)(1) of pending U.S. Patent Application Ser. No. 60/485,366 entitled Supplemental Reset Pulse, and filed 8 Jul. 2003, which is hereby incorporated in its entirety.

CROSS-REFERENCE TO RELATED APPLICATIONS

The following patents and/or commonly assigned patent applications are hereby incorporated herein by reference:

| Patent No. | Filing Date | Issue Date | Title |
| --- | --- | --- | --- |
| 5,061,049 | Sep. 13, 1990 | Oct. 29, 1991 | Spatial Light Modulator and Method |
| 5,583,688 | Dec. 21, 1993 | Dec. 10, 1996 | Multi-Level Digital Micromirror Device |
| 6,466,358 | Dec. 28, 2000 | Oct. 15, 2002 | Analog Pulse Width Modulation Cell for Digital Video Data |
| 6,590,549 | Dec. 21, 1999 | Jul. 8, 2003 | Analog Pulse Width Modulation of Video Data |

FIELD OF THE INVENTION

This invention relates to the field of micromirror devices, more particularly to methods of operating micromirror systems.

BACKGROUND OF THE INVENTION

Micromirror devices are small structures typically fabricated on a semiconductor wafer using techniques such as optical lithography, doping, metal sputtering, oxide deposition, and plasma etching which have been developed for the fabrication of integrated circuits. One commercially successful micromirror device is the digital micromirror device manufactured by Texas Instruments, which is used as the spatial light modulator in the DLP-branded image projectors.

Micromirror devices are primarily used in optical display systems. In display systems, the micromirror is a light modulator that uses digital image data to modulate a beam of light by selectively reflecting portions of the beam of light to a display screen. While analog modes of operation are possible, micromirrors typically operate in a digital bistable mode of operation and as such are the core of the first true digital full-color image projection systems.

Micromirrors have evolved rapidly over the past ten to fifteen years. Early devices used a deformable reflective membrane which, when electrostatically attracted to an underlying address electrode, dimpled toward the address electrode. Schlieren optics illuminate the membrane and create an image from the light scattered by the dimpled portions of the membrane. Schlieren systems enabled the membrane devices to form images, but the images formed were very dim and had low contrast, making them unsuitable for most image display applications.

Later micromirror devices used flaps or diving board-shaped cantilever beams of silicon or aluminum, coupled with dark-field optics to create images having improved contrast. Flap and cantilever beam devices typically used a single metal layer to form the top reflective layer of the device. This single metal layer tended to deform over a large region, however, which scattered light impinging on the deformed portion. Torsion beam devices use a thin metal layer to form a torsion beam, which is referred to as a hinge, and a thicker metal layer to form a rigid member, or beam, typically having a mirror-like surface: concentrating the deformation on a relatively small portion of the micromirror surface. The rigid mirror remains flat while the hinges deform, minimizing the amount of light scattered by the device and improving the contrast of the projected image.

Recent micromirror configurations, called hidden-hinge designs, further improve the image contrast by fabricating the mirror on a pedestal above the torsion beams. The elevated mirror covers the torsion beams, torsion beam supports, and a rigid yoke connecting the torsion beams and mirror support, further improving the contrast of images produced by the device.

In addition to the improvements to the structure of the micromirror itself, many improvements have been made in the pulse width modulation techniques used to create the perception of analog intensity levels from the purely digital device. The creation of the appearance of smooth analog intensities depends in large part on the ability of the micromirror system rapidly to switch the micromirror elements on and off to transmit very short pulses of light onto the image plane. Short bit pulses increase bit depth, or the number of data bits that may be displayed in a given frame period. As the contrast and bit depth of the projected image increases, very minor pulse width modulation errors become noticeable to the human eye are result in objectionable image artifacts. What is needed is a method and system of reducing the occurrence and effect of pulse width modulation errors.

SUMMARY OF THE INVENTION

Objects and advantages will be obvious, and will in part appear hereinafter and will be accomplished by the present invention which provides a method and system for minimizing the visual impact of temporarily malfunctioning micromechanical elements.

One embodiment of the claimed invention provides a method and system of providing a supplemental reset pulse to a micromirror array. The supplemental reset pulse provides a second opportunity to change the state of micromirrors that, for any of a variety of reasons, failed to assume the desired state during the mirror transition operation commonly referred to as a reset or reset sequence. The supplemental reset pulse preferably is performed at a time that prevents its use from adversely affecting any micromirrors that are operating properly, yet soon enough after the initial reset sequence that the impact of the light reflected by the stuck mirror is minimized.

According to one embodiment of the present invention, data is loaded in to micromirror element and the micromirror element is reset twice prior to additional data being loaded into the micromirror element.

According to another embodiment of the present invention, a reset and release sequence is used in which data is loaded into the micromirror element and the position of the micromirror element is set to correspond to the data, then the micromirror is moved to a neutral position regardless of the data loaded into the micromirror. After the signals to move the mirror to the neutral position are provided, an additional reset sequence is provided to move any temporarily stuck mirrors to the neutral position.

According to another embodiment of the present invention, a reset sequence is used in which data is loaded into a micromirror element and the micromirror element is then reset, or electrostatically controlled to assume the mirror position indicated by the data loaded into the micromirror element. A signal is then received to indicate that all of the micromirrors in a group of micromirrors receiving the signal are to be reset to predetermined position. Typically the signal is a clear signal and the predetermined position is one which does not reflect light to a region, such as a display screen. The mirrors are then reset to assume the position, and a second reset signal is given to provide a second attempt to move the micromirrors to the predetermined position.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

A method and system for increasing the accuracy of the operation of a micromechanical device. Typical use of particular embodiments of the invention, known as a supplemental reset pulse, results in reducing the visual impact of improper mirror operation. Generally the micromirror array is driven using well know pulse width modulation (PWM) modulation techniques. While embodiments of the invention may be used during any PWM bit period, the supplemental reset pulse finds particular application during very short PWM bit periods.

During very short PWM bit periods, various factors can cause the micromirror element to undergo an atypical reset. For example, a worn passivation layer, accumulated residual twist of metal torsion hinge, impurities on the parts of the micromirror such as the hinge, mirror, or landing zones, or other factors may cause an otherwise properly functioning micromirror to occasionally fail to operate in the proper position.

These periods of improper mirror operation are most commonly seen as a short duration bright pulse. These image artifacts are called "twinklers," due to the similarity of the error to twinkling stars. Although not nearly as troublesome, pixels may incorrectly take the dark state as well as the bright state to create a dark twinkler error. Twinklers primarily are noticeable in dark images where the bright pulse stands out against the dark background, but they also occur in images with relatively high intensity levels. An understanding of twinklers and steps taken to minimize them benefits from an understanding of the mechanics and dynamics of the micromirror device.

Digital Micromirror Device

Figure 1:
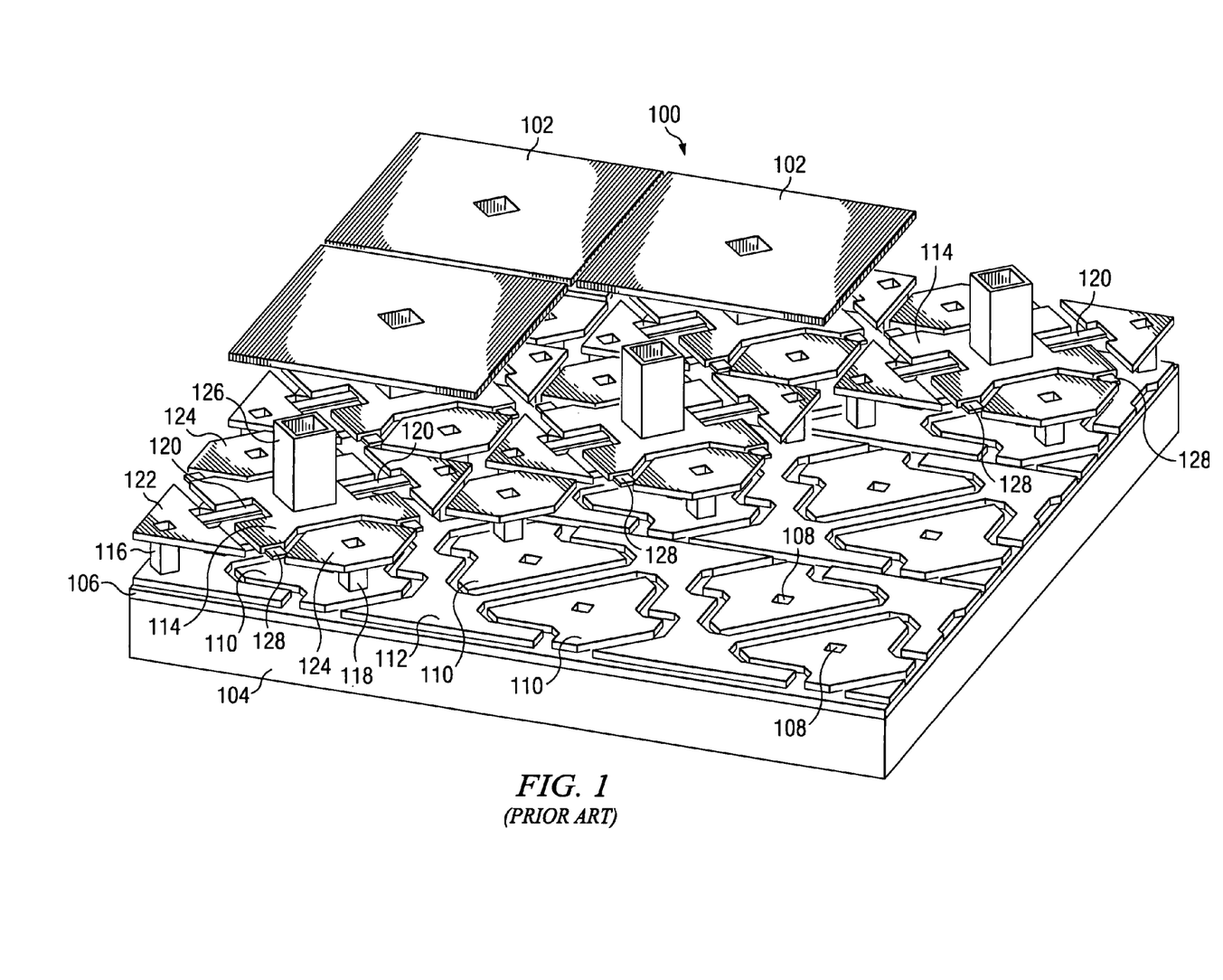
FIG. 1 is a perspective view of a small portion of a micromirror array of the prior art.
Figure 2:
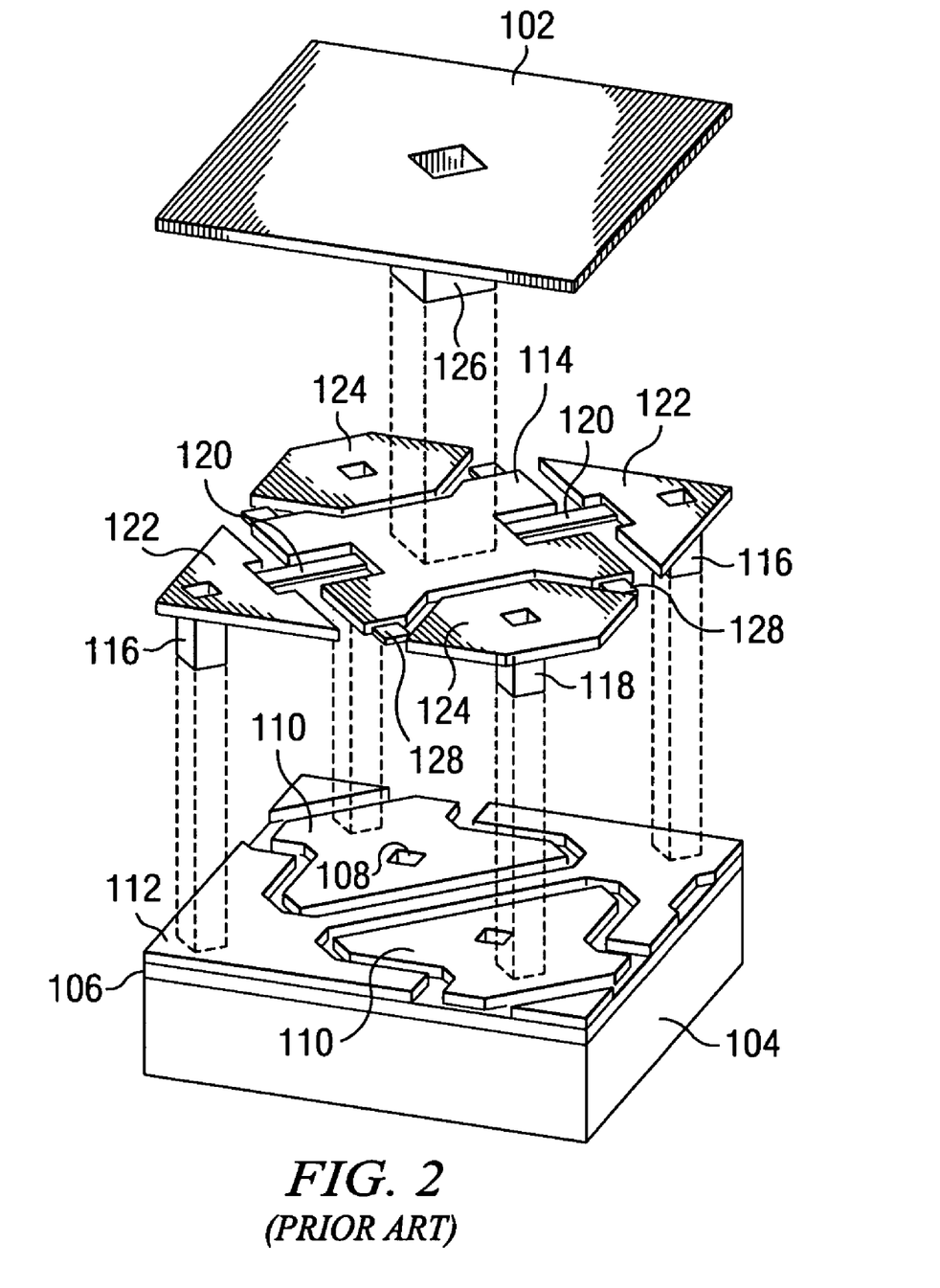
FIG. 2 is an exploded perspective view of a single micromirror element from the micromirror array of FIG. 1.

A typical hidden-hinge micromirror 100 is actually an orthogonal array of micromirror cells, or elements. This array often includes more than a thousand rows and columns of micromirrors. FIG. 1 shows a small portion of a micromirror array of the prior art with several mirrors 102 removed to show the underlying mechanical structure of the micromirror array. FIG. 2 is an exploded view of a single micromirror element of the prior art further detailing the relationships between the micromirror structures.

A micromirror is fabricated on a semiconductor, typically silicon, substrate 104. Electrical control circuitry is typically fabricated in or on the surface of the semiconductor substrate 104 using standard integrated circuit process flows. This circuitry typically includes, but is not limited to, a memory cell associated with, and typically underlying, each mirror 102 and digital logic circuits to control the transfer of the digital image data to the underlying memory cells. Voltage driver circuits to drive bias and reset signals to the mirror superstructure may also be fabricated on the micromirror substrate, or may be external to the micromirror. Image processing and formatting logic is also formed in the substrate 104 of some designs. For the purposes of this disclosure, addressing circuitry is considered to include any circuitry, including direct voltage connections and shared memory cells, used to control the direction of rotation of a micromirror.

The silicon substrate 104 and any necessary metal interconnection layers are isolated from the micromirror superstructure by an insulating layer 106 which is typically a deposited silicon dioxide layer on which the micromirror superstructure is formed. Holes, or vias, are opened in the oxide layer to allow electrical connection of the micromirror superstructure with the electronic circuitry formed in the substrate 104.

Address electrodes 110 and a mirror bias connection 112 are formed from a metal layer deposited on the insulating layer 106. Some micromirror designs have separate and distinct landing electrodes which are electrically connected to the mirror bias connection 112. Landing electrodes limit the rotation of the mirror 102 and prevent the rotated mirror 102 or hinge yoke 114 from touching the address electrodes 110, which have a voltage potential relative to the mirror 102. If the mirror 102 contacts the address electrodes 110, the resulting short circuit could fuse the torsion hinges 120 or weld the mirror 102 to the address electrodes 110, in either case ruining the micromirror. Since the same voltage is always applied both to the landing electrodes and the mirrors 102, the mirror bias connection and the landing electrodes are combined in a single structure when possible. The landing electrodes are combined with the mirror bias connection 112 by including regions on the mirror bias/reset connection 112, called landing sites, which mechanically limit the rotation of the mirror 102 by contacting either the mirror 102 or the torsion hinge yoke 114. These landing sites are often coated with a material chosen to reduce the tendency of the mirror 102 and torsion hinge yoke 114 to stick to the landing site.

Hinge support spacervias 116 and upper address electrode spacervias 118, typically extend approximately 1 µm above the address electrodes 110 and mirror bias connections 112. A hinge cap 122 and upper address electrodes 124 are supported by the hinge support spacervias 116 and upper address electrode spacervias 118. The hinge cap 122 anchors the ends of torsion hinges 120. A hinge yoke 114 is formed between and supported by the torsion hinges 120. The hinge yoke 114 is allowed to rotate by twisting the thin torsion hinges 120. A mirror support spacervia 126 is formed on the hinge yoke, and supports a mirror 102 approximately 2 µm above the hinge yoke 114.

Operation of the Digital Micromirror Device

A thorough explanation of the operation of a digital micromirror device is provided by Meier, *DMD Pixel Mechanics Simulation*, Texas Instruments Technical Journal, v. 15, no. 3, pp. 64-74, one article in a special issue of the Texas Instruments Technical Journal which is hereby incorporated by reference in its entirety.

Electrostatic attraction between an address electrode 110 and a deflectable rigid member, which in effect form the two plates of an air gap capacitor, is used to rotate the mirror structure. Depending on the design of the micromirror device, the deflectable rigid member is the torsion beam yoke 114, the beam or mirror 102, a beam attached directly to the torsion hinges, or a combination thereof. The upper address electrodes 124 also electrostatically attract the deflectable rigid member.

The force created by the voltage potential is a function of the reciprocal of the distance between the two plates. As the rigid member rotates due to the electrostatic torque, the torsion beam hinges resist deformation with a restoring torque that is an approximately linear function of the angular deflection of the torsion beams. The structure rotates until the restoring torsion beam torque equals the electrostatic torque or until the rotation is mechanically blocked by contact between the rotating structure and a fixed component. Most micromirror devices are operated in a digital mode wherein sufficiently large bias voltages are used to ensure full deflection of the micromirror superstructure.

When operated digitally, each micromirror is fully deflected in either of the two directions about the torsion beam axis. Digital operation uses a relatively large voltage to ensure the mirror is fully deflected. Since it is advantageous to drive the address electrode using standard logic voltage levels, a bias voltage is applied to the mirror metal layer to increase the voltage difference between the address electrodes and the mirrors. Use of a sufficiently large mirror bias voltage—a voltage above what is termed the collapse voltage of the device—ensures the mirror will deflect to the closest landing electrodes even in the absence of an address voltage. Therefore, by using a large mirror bias voltage, the address voltages need only be large enough to deflect the mirror slightly. Typical logic high address voltages are 7.5 volts or less, while typical bias voltages are in the range of 20 to 24 volts and may be negative or positive voltages.

Once the mirror is collapsed, or landed against the landing zone, the mirror bias voltage will hold the mirror in the landed position regardless of the address voltages applied to the underlying address electrodes. Therefore, once the mirror is landed, the data in the memory cell driving the address electrodes may be changed to reflect the next desired state of the mirror without affecting the current state of the mirror.

Although the discussion is focused on a typical digital micromirror device as produced by Texas Instruments Incorporated, it should be realized that other micromirrors use various other addressing schemes to position their mirrors. The same inventive concepts taught herein apply to alternate micro-electro-mechanical systems (MEMS), micromirror structures, and addressing methods and systems. For example, some micromirrors operate in a mirror addressed mode, wherein they apply the memory cell data voltage to the micromirror rather than the address electrodes.

Figure 3:
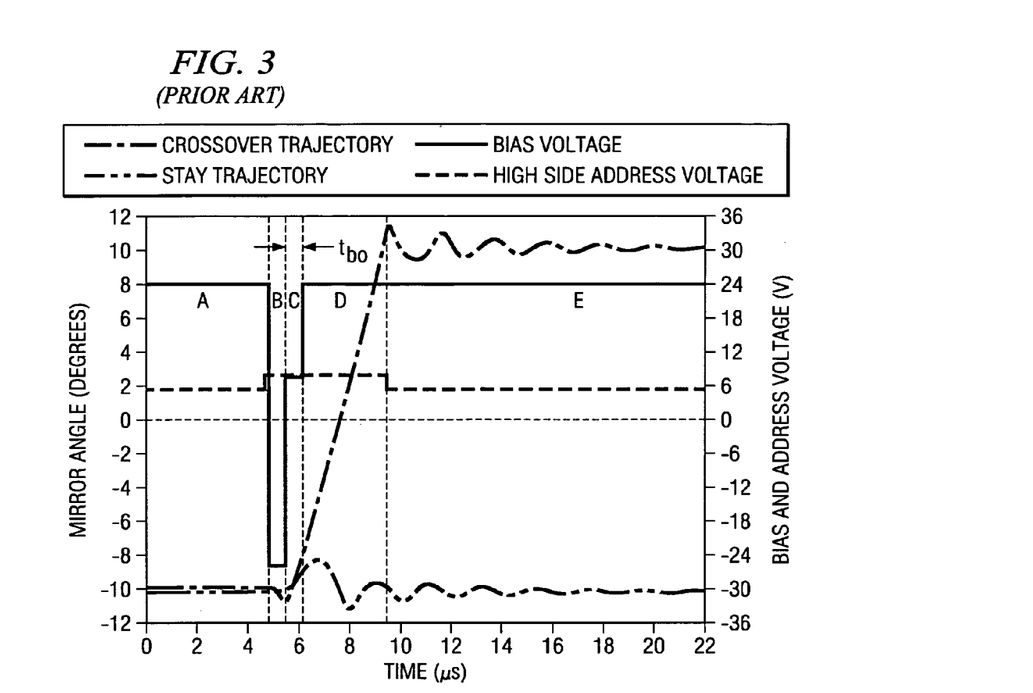
FIG. 3 is a plot of a set of reset voltage signals used to perform a reset sequence to change the state of a landed micromirror and a plot of the position of a representative micromirror for both a stay trajectory and a crossover trajectory according to the prior art.
Figure 4:
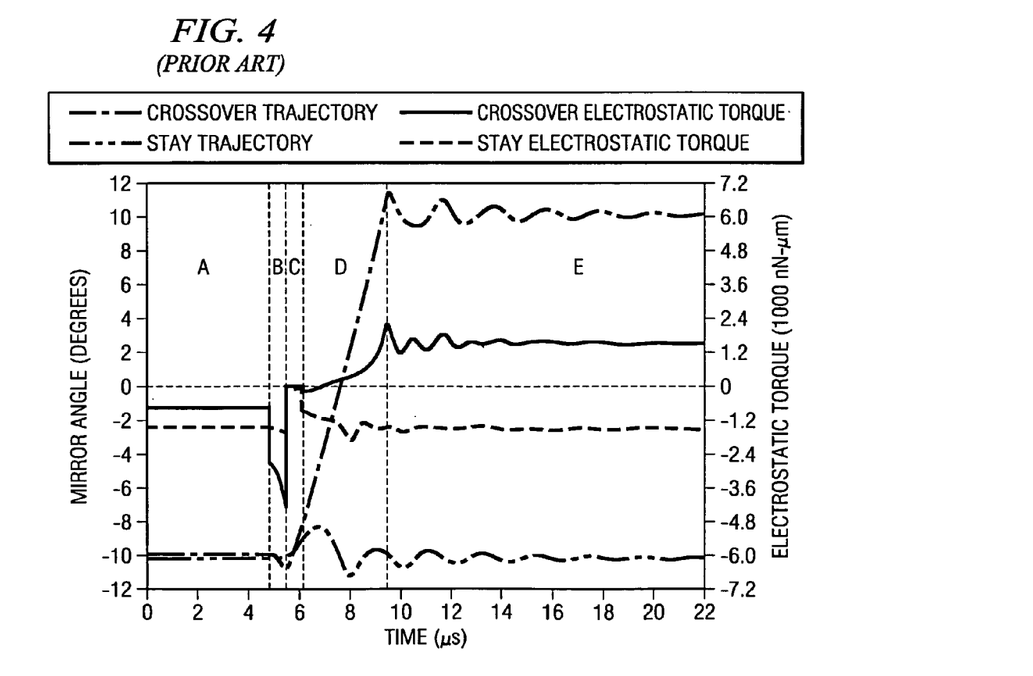
FIG. 4 is a plot of a torque produced by the electrostatic forces resulting from the reset voltage signals shown in FIG. 3 and a plot of the position of a representative micromirror for both a stay trajectory and a crossover trajectory according to the prior art.
Figure 5:
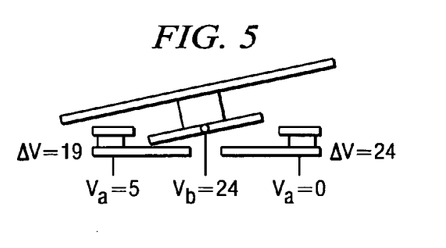
FIG. 5 is a schematic side view of a micromirror and address electrodes showing the application of a mirror bias voltage and address voltages and the resulting voltage differences creating the electrostatic forces that control the operation of the micromirror during a portion of a reset sequence.
Figure 6:
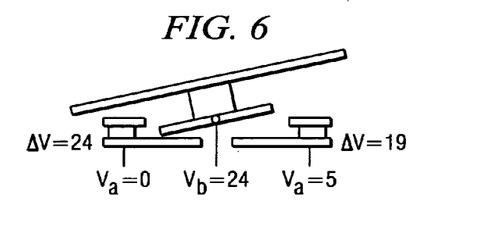
FIG. 6 is a schematic side view of a micromirror and address electrodes showing the application of a mirror bias voltage and address voltages and the resulting voltage differences creating the electrostatic forces that control the operation of the micromirror during a portion of a reset sequence.
Figure 7:
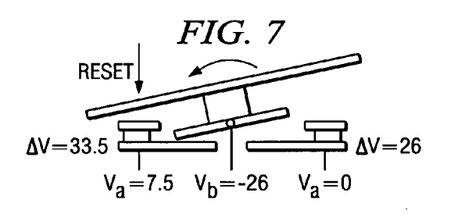
FIG. 7 is a schematic side view of a micromirror and address electrodes showing the application of a mirror bias voltage and address voltages and the resulting voltage differences creating the electrostatic forces that control the operation of the micromirror during a portion of a reset sequence.
Figure 8:
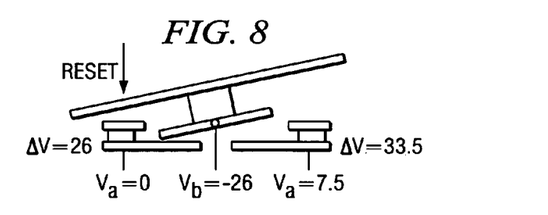
FIG. 8 is a schematic side view of a micromirror and address electrodes showing the application of a mirror bias voltage and address voltages and the resulting voltage differences creating the electrostatic forces that control the operation of the micromirror during a portion of a reset sequence.
Figure 9:
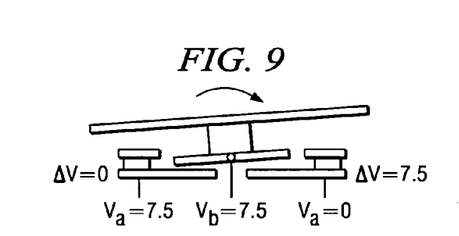
FIG. 9 is a schematic side view of a micromirror and address electrodes showing the application of a mirror bias voltage and address voltages and the resulting voltage differences creating the electrostatic forces that control the operation of the micromirror during a portion of a reset sequence.
Figure 10:
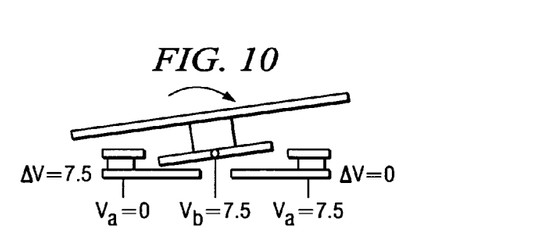
FIG. 10 is a schematic side view of a micromirror and address electrodes showing the application of a mirror bias voltage and address voltages and the resulting voltage differences creating the electrostatic forces that control the operation of the micromirror during a portion of a reset sequence.
Figure 11:
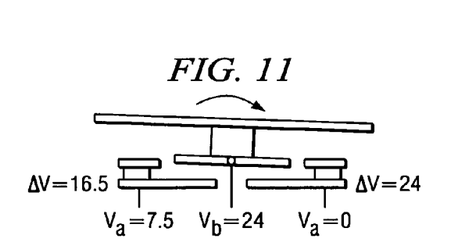
FIG. 11 is a schematic side view of a micromirror and address electrodes showing the application of a mirror bias voltage and address voltages and the resulting voltage differences creating the electrostatic forces that control the operation of the micromirror during a portion of a reset sequence.
Figure 12:
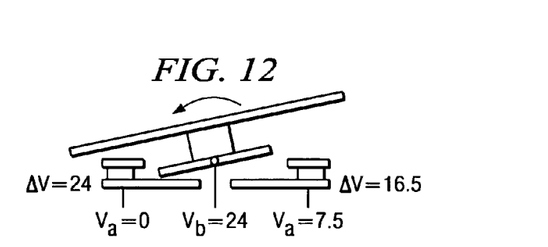
FIG. 12 is a schematic side view of a micromirror and address electrodes showing the application of a mirror bias voltage and address voltages and the resulting voltage differences creating the electrostatic forces that control the operation of the micromirror during a portion of a reset sequence.
Figure 13:
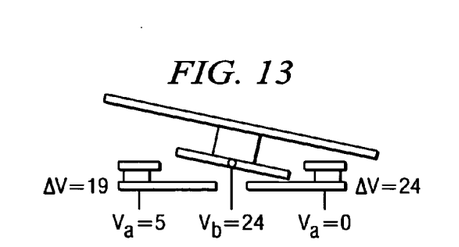
FIG. 13 is a schematic side view of a micromirror and address electrodes showing the application of a mirror bias voltage and address voltages and the resulting voltage differences creating the electrostatic forces that control the operation of the micromirror during a portion of a reset sequence.
Figure 14:
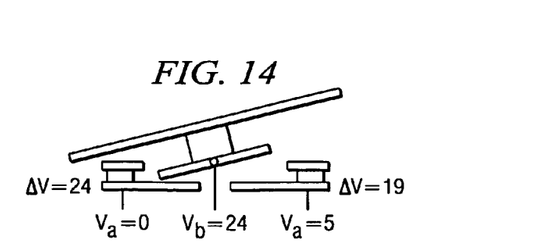
FIG. 14 is a schematic side view of a micromirror and address electrodes showing the application of a mirror bias voltage and address voltages and the resulting voltage differences creating the electrostatic forces that control the operation of the micromirror during a portion of a reset sequence.

FIGS. 3 and 4 detail one possible set of voltages used to perform a reset sequence to change the state of a landed micromirror. The voltages applied to the micromirror typically are called the mirror bias voltages, bias voltages, reset bias voltages, or simply reset voltages. The function of the reset bias voltage is to electrostatically latch the micromirror in the existing position during most of the micromirror's duty cycle and to create sufficient electrostatic forces during the reset operation to force the micromirrors to either stay at or rotate to the side of the micromirror element corresponding to the address voltages applied to the address electrodes. The address voltages are determined by a data bit stored in a memory cell associated with the micromirror element. In additional to assisting in the creation of the electrostatic forces used to direct the rotation of the micromirror about the torsion hinge, the reset signal typically includes a large voltage pulse, often a negative voltage pulse, that stores energy in the mirror element to allow the mirror element to separate from the landing zone. This energy overcomes the forces attracting the mirror element to the landing zone and the sticking forces or friction forces, often called stiction forces, that resist the mirror element's separation from the landing zone.

FIGS. 5-14 show the application of the voltages to the micromirror for both a stay (on-on or off-off) and cross-over (on-off or off-on) transition, as well as the voltage differentials for the various components of the micromirror. FIGS. 5, 7, 9, 11, and 13 illustrate one embodiment of a crossover transition. FIGS. 6, 8, 10, 12, and 14 illustrate one embodiment of a stay transition. Details for the transitions are found in Meier cited above.

Pulse Width Modulation

As mentioned above, intermediate intensity levels are generated by rapidly switching the micromirror between the on and off states. Often the array is operated in blocks, or groups of mirror elements, to prevent having to load the entire device between each reset. Block operation of the array lowers the data path bandwidth required for a given image bit-depth.

Whether the entire array is reset at once, or by blocks, typically it is desirable to create very short bit periods. The duration of these very short bit periods is insufficient to allow the entire micromirror array or block of the micromirror array to be loaded with image data for the next bit period.

One method of creating bits shorter than the load time of the micromirror array or a block of the micromirror array is to load a data bit having a very low bit weight into the micromirror memory array, reset and land the mirror so that the mirror assumes that state represented by the memory bit, and then reset the mirror without applying the mirror bias voltage so that the mirror takes a neutral, or flat, state regardless of the image data value stored in the memory cell. The mirror remains in the flat state while the new image data is loaded into the memory array. Depending on the context, the term reset may mean a reset sequence including the application of a mirror bias voltage to hold the mirror in a landed position, or a reset sequence without the application of a mirror bias voltage such that the mirror assumes and maintains a neutral or undeflected position.

Another method of creating bits shorter than the load time of the micromirror array or a block of the micromirror array is to provide a means of clearing the memory cells without having to load image data into each cell. The ability to clear the memory typically is limited by the current necessary to write to large numbers of memory cells. As a result, groups of memory cells—but generally not the entire array—may be written to simultaneously, and a reset block may be cleared very rapidly. This feature is used to create very short bit durations by clearing the memory as soon as the mirrors settle into a position representing the short bit's state. After the desired bit duration the mirrors are once again reset and the mirror bias voltage is applied to force all of the mirrors in the array to an off state.

Figure 15:
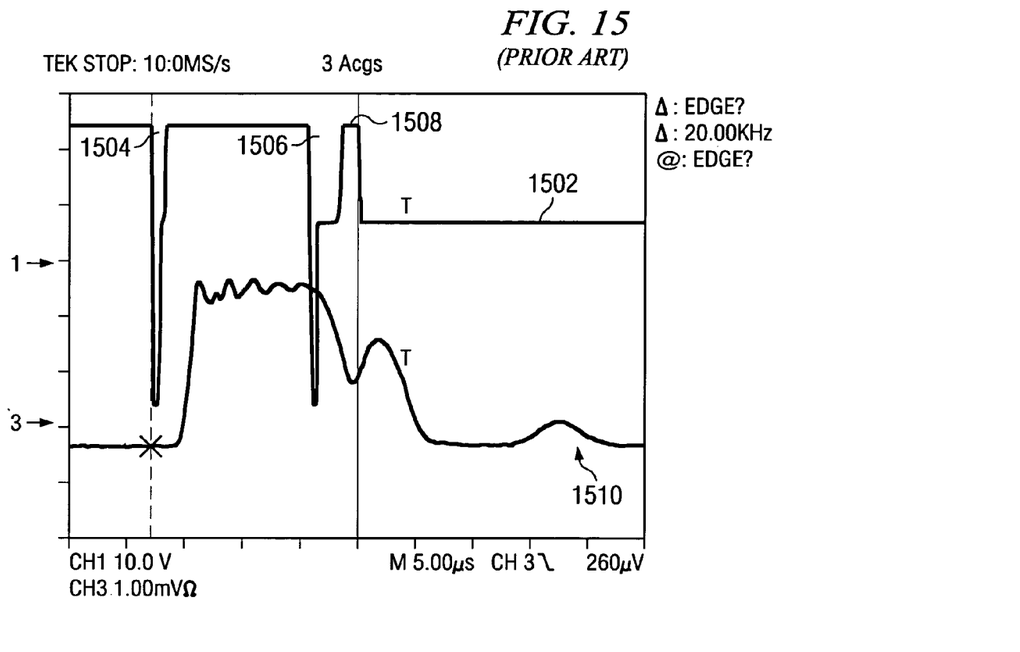
FIG. 15 is a plot of the reset bias voltage signal applied to a micromirror and a plot of the position of the micromirror as a result of the reset bias voltage during a crossover transition according to the prior art.
Figure 19:
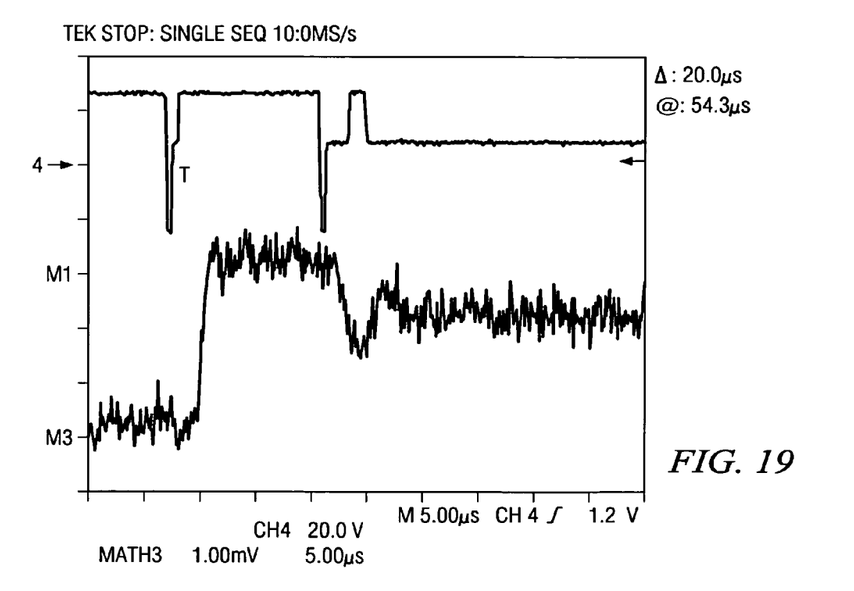
FIG. 19 is a plot of the reset bias voltage and mirror position for a micromirror pixel illustrating the operation of a temporarily stuck pixel.

FIG. 15 illustrates the release sequence for a short bit during a global clear operation. In FIG. 15, the reset voltage plot 1502 includes a first reset pulse 1504 storing energy in the mirror element, which generally includes any rotating members associated with the micromirror element. After the reset pulse 1504, the micromirror is allowed time to assume the next desired position or state, and a second reset pulse 1506 is applied to the reset bias. FIG. 15 also illustrates a damping pulse 1508 sometimes used to dampen the motion of the micromirror. FIG. 19 illustrates the operation of a micromirror pixel that sticks in position rather than transitioning as intended.

Using these two methods, the reset and release method and the global clear method, enables minimum bit periods that are limited by the dynamics of the mirrors themselves. Mirror dynamics are largely determined by the mechanical dimensions of the mirror, hinges, and supporting structures, the materials used to form the micromirror structures and the conditions under which the structures are fabricated, the damping effect of the gases in the micromirror package, and the voltages used to drive the micromirror. Two additional factors, stiction and hinge torque, cause mirror-to-mirror variances within an array of the mirror elements. These mirror-to-mirror variances create problems when operating the micromirror array to create very short bit periods.

Stiction—the sticking friction that occurs when a mirror lands on the landing zone—must be overcome to produce reliable micromirror devices. Many methods have been used to reduce stiction. The most successful method thus far has been to coat the surfaces of the micromirror device with a monolayer of perfluorodecanoic acid, of PFDA. PFDA is a long carbon chain molecule with a chemically very active end and a chemically inert end. The active end strongly bonds to the aluminum superstructure of the micromirror creating a monolayer of densely packed molecules similar to hair. The opposite chemically inert ends of the molecules present a chemically inert and un-polarized surface that has very low stiction and hinders water from bonding to the surface of the aluminum structures. This minimizes the van der Waals forces acting on the landed mirror.

It is very difficult to deposit a uniform layer of PFDA underneath the mirror array of a micromirror device. As a result, some landing zones may exhibit higher stiction than others resulting in mirrors that release slower or with less energy than other mirrors. Likewise, the PFDA layer may become damaged or contaminated, increasing the stiction and slowing the mirror release. The slight increase in stiction that potentially causes twinklers in a "sticky" pixel has been shown to not be an early indicator of device failure.

The hinges about which the mirror rotates typically are formed from aluminum. After long periods of operation in a single mirror state, the hinges become deformed in the predominate direction they have been operated in. This deformation, or torqueing, results in a slight preference to the predominate state when no bias voltages are applied which makes it easier to set the mirror in that state.

Both mirror torqueing and stiction can result in mirrors that reset less effectively or slower than the average mirror in the array. Furthermore, some mirrors simply oscillate more when landed, resulting in a less effective reset after short duration bit periods. Mirror torqueing, stiction, and oscillating mirrors are just a few of the conditions that may cause mirrors to stay in the "on" position after the reset. When operated in very short bit periods, the mirror bias voltage may be re-applied before the mirror escapes from the "on" position—resulting in a mirror that stays "on" during the mirror load period. Since the mirror load period is considerably longer than the very short bit period, a noticeable amount of light is conveyed to the image during the period when the mirror accidentally stays on, thus creating the twinkler.

Figure 16:
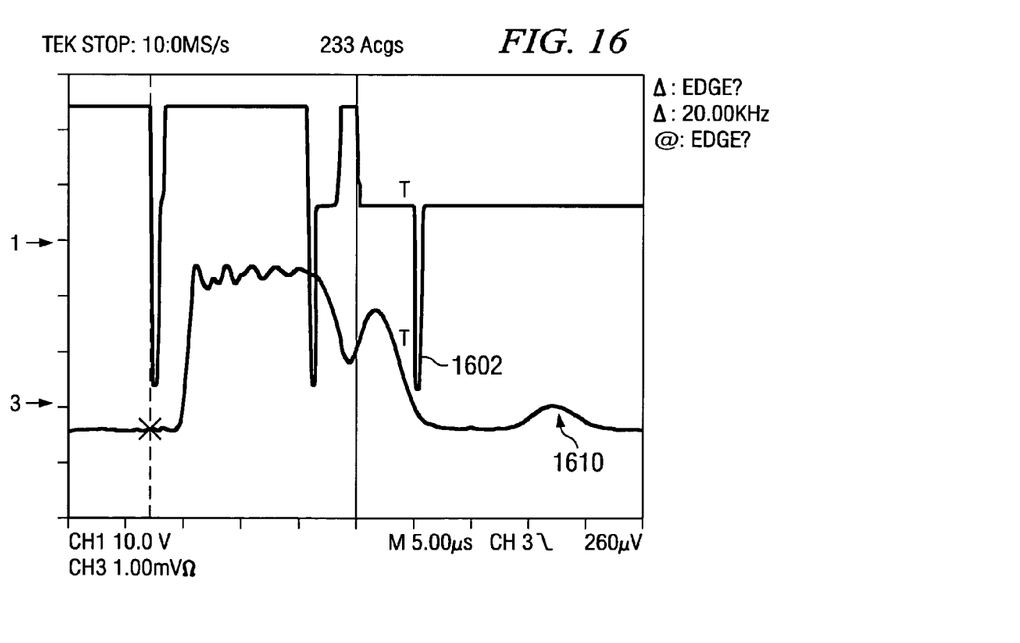
FIG. 16 is a plot of the reset bias voltage signal, having an additional reset pulse according to one embodiment of the present invention, applied to a micromirror and a plot of the position of the micromirror as a result of the reset bias voltage during a crossover transition.
Figure 17:
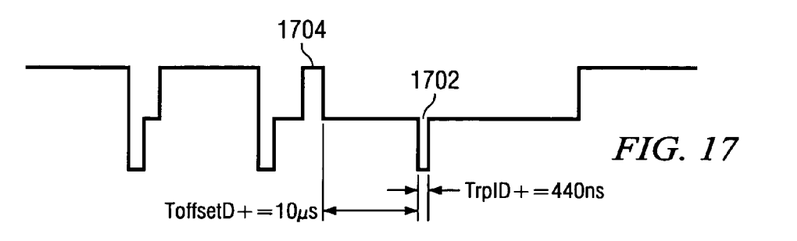
FIG. 17 is a plot of the reset bias voltage signal according to one embodiment of the present invention showing the relative timing between a damping pulse and an additional reset pulse.
Figure 18:
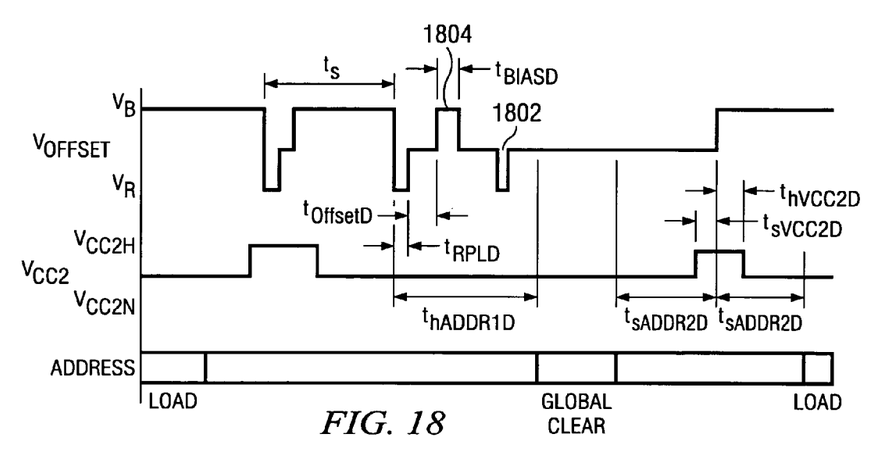
FIG. 18 is a plot of the voltages applied to a micromirror element during a global clear reset operation including a supplemental reset pulse according to one embodiment of the present invention.

The present inventive technique varies from previous attempts to deal with twinklers by not attempting to eliminate or reduce the numbers of twinklers, but rather by minimizing the effect of the twinklers. It has been discovered that an additional reset pulse, provided about 10 µS after the original reset pulse, operates to reset the "stuck" pixels without perturbating the pixels that have already released, in the case of the reset and release methods, or settled in the off state, in the case of the global clear methods. FIGS. 16-18 illustrate various implementations of this additional reset pulse.

FIG. 16 is similar to FIG. 15, but includes an additional reset pulse, or supplemental reset pulse 1602, to provide an additional opportunity for mirrors to properly reset. The location of the supplemental reset pulse 1602 is selected to provide a high rate of success in resetting sticky mirrors while not affecting the operation of properly resetting mirrors. In the example shown in FIG. 17, the supplemental reset pulse 1702 is 10 µS after the damping pulse 1704. Pixel dynamics studies show that by 10 µS is pixel is past its major oscillations and the pulse will be effective.

The width of the supplemental reset pulse depends on the design of the micromirror element. Pulse widths ranging from 360 nS to 520 nS have all been shown to work well for the DDR micromirror array. A value of 400 nS, was chosen as being in the center of this range.

In the global clear example of FIG. 16, the mirrors are nearly settled into their landed position, and very little perturbation results from the supplemental reset pulse. This is illustrated by comparing the mirror position during region 1510—which has not be affected by the supplemental reset pulse—with the mirror position during region 1610—which has been affected by the supplemental reset pulse 1602.

As illustrated in FIGS. 16 and 18, the result of the additional or supplemental reset pulse is that the twinklers that occur, occur for much shorter period than in prior art systems. This makes them much less noticeable, not only reducing the impact of the artifact but, as studies have shown sticky pixels are not an indication of future unreliable operation, allows the use of micromirror arrays that previously would have been scrapped as unusable.

Description of Display System

To create an image using the micromirror device, the light source is positioned at an angle equal to twice the angle of rotation so that mirrors rotated toward the light source reflect light in a direction normal to the surface of the micromirror device and into the aperture of a projection lens—creating a bright pixel on the image plane. Mirrors rotated away from the light source reflect light away from the projection lens—leaving the corresponding pixel dark. Intermediate brightness levels are created by pulse width modulation techniques in which the mirror is rapidly and repetitively rotated on and off. The duty cycle of the mirror determines the quantity of light reaching the image plane. The human eye integrates the light pulses and the brain perceives a flicker-free intermediate brightness level.

Full-color images are generated by using three micromirror devices to produce three single-color images, or by sequentially forming three single-color images using a single micromirror device illuminated by a beam of light passing through three color filters mounted on a rotating color wheel.

Figure 20:
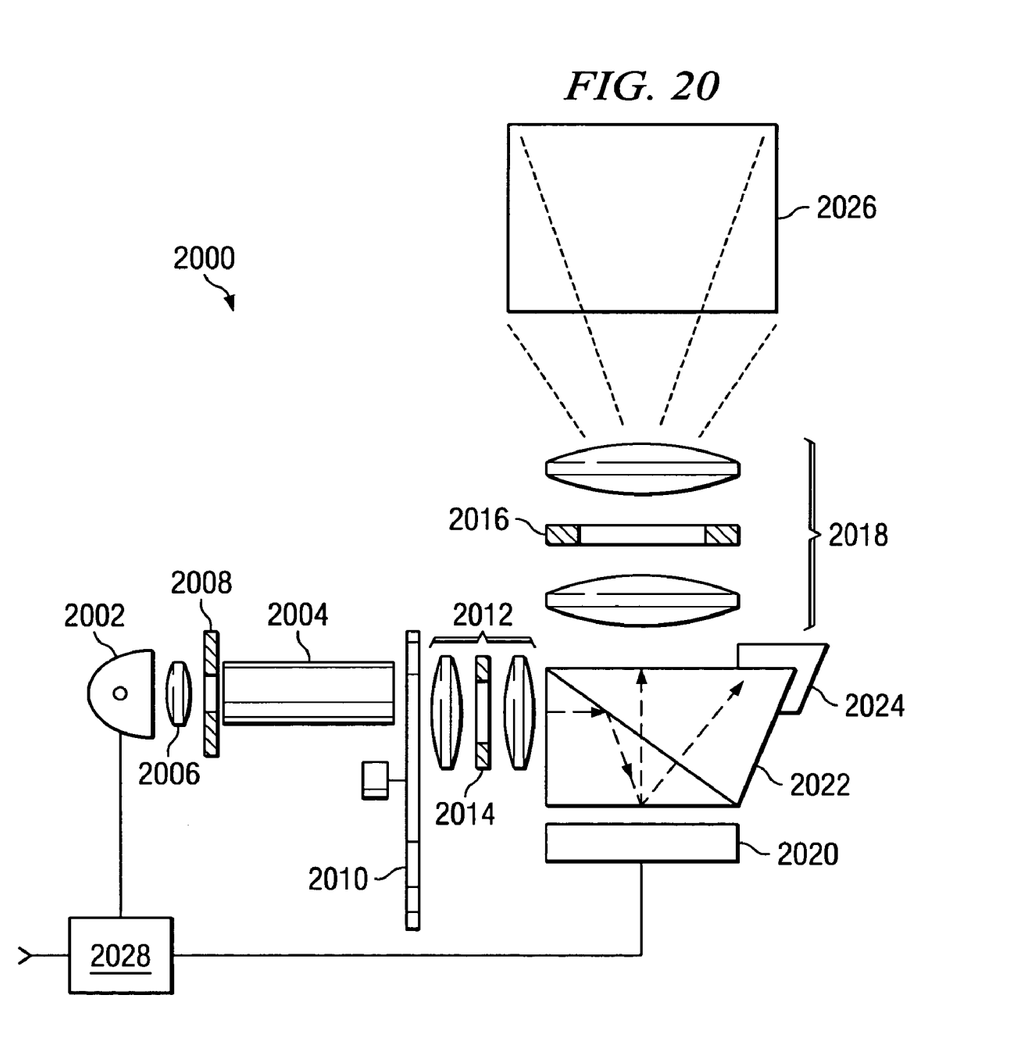
FIG. 20 is a schematic view of a micromirror-based projection system utilizing an improved micromirror device according to one embodiment of the present invention.

FIG. 20 is a schematic view of a micromirror-based projection system 2000 utilizing the one embodiment of the methods described herein. In FIG. 20, light from light source 2004 is focused on the entrance pupil of an integrating rod 2004 by lens group 2006. The entrance pupil of the integrating rod 2004 is surrounded by a reflective aperture stop 2008. Light striking the reflective aperture stop 2008 is returned to the light source. The integrating rod 2004 homogenizes the light passing through it. Light exiting the integrating rod 2004 passes through a color wheel 2010—which may be a scrolling color wheel or other type of recycling color wheel.

The light passing through the color wheel 2010 is focused by lens group 2012. Aperture stop 2014 typically is located in lens group 2012. Lens group 2012 focuses the illumination light onto a spatial light modulator 2020 through a TIR prism assembly 2022. The off state light and the flat state light are directed to a light dump 2024 which absorbs the light.

On state light exits the TIR prism assembly 2022 and enters the projection lens 2018. Another aperture stop 2016 typically is used in the projection lens 2018 to block a portion of the light, preventing it from passing through the lens to the image plane 2022. Controller 2028 provides image data and control signals, including the supplemental reset pulse described above, to the spatial light modulator 2020 to control the modulation of the illumination light in order to form an image on the image plane 2026. Similar projection methods are used with color splitting prisms and three modulators in high brightness color projectors.

Thus, although there has been disclosed to this point a particular embodiment for a method and system of minimizing artifacts in a spatial light modulator system, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A method of operating a micromechanical device, the method comprising:

provideing a micromirror device comprising a deflectable member;

loading position data in said micromechanical device;

providing a primary reset to an input of said micromirror device intended to drive said deflectable member to a position corresponding to said position data;

delaying while holding said input at a intermediate voltage;

providing a damping pulse to said input, said intermediate voltage between the level of said primary reset and said damping pulse; and after a delay period after the primary reset, providing a supplemental reset intended to drive said deflectable member to said position.

2. A method of operating a micromechanical device, the method comprising:

providing a micromirror device comprising a deflectable member;

providing a primary reset to an input of said micromirror device intended to drive said deflectable member to a neutral position;

delaying while holding said input at a intermediate voltage;

providing a damping pulse to said input, said intermediate voltage between the level of said primary reset and said damping pulse; and after a delay period after the primary reset, providing a supplemental reset intended to drive said deflectable member to said neutral position.

3. A micromechanical system comprising:

a micromirror device comprising a deflectable member; and electronics to provide a primary reset having a first voltage, an intermediate voltage level, a damping pulse having a second voltage, and a supplemental reset delayed from the primary reset to said deflectable member, and wherein said intermediate voltage level is between said first and said second voltage levels.

\* \* \* \* \*